United States Patent [19]
Blue et al.

[11] 3,920,343
[45] Nov. 18, 1975

[54] KEY-AND-KEYWAY COUPLING FOR TRANSMITTING TORQUE

[75] Inventors: Steven C. Blue; Mark T. Curtis, both of Paducah, Ky.; William C. Orthwein, Carbondale; Daniel H. Stitt, Metropolis, both of Ill.

[73] Assignee: The United States of America as represented by the United States Energy Research and Development Administration, Washington, D.C.

[22] Filed: Nov. 13, 1974

[21] Appl. No.: 523,377

[52] U.S. Cl. .............................................. 403/356
[51] Int. Cl.² ........................................... F16D 1/08
[58] Field of Search ........... 403/356, 357, 358, 318, 403/319

[56] References Cited
UNITED STATES PATENTS

| | | | |
|---|---|---|---|
| 2,041,123 | 5/1936 | Foppl | 403/356 |
| 2,332,270 | 10/1943 | Shaw | 403/358 |
| 2,937,042 | 5/1960 | Wilder, Jr. | 403/356 X |
| 3,501,973 | 3/1970 | Casale | 403/356 X |
| 3,637,225 | 1/1972 | Schmuck | 403/356 X |

*Primary Examiner*—Andrew V. Kundrat
*Attorney, Agent, or Firm*—Dean E. Carlson; David S. Zachry; Fred O. Lewis

[57] ABSTRACT

This invention relates to an improved key-and-keyway coupling for the transmission of torque. The coupling provides significant reductions in stress concentrations in the vicinity of the key and keyway. The keyway is designed with a flat-bottomed ⌴-shaped portion whose inboard end terminates in a ramp which is dished transversely, so that the surface of the ramp as viewed in transverse section defines an outwardly concave arc.

10 Claims, 4 Drawing Figures

KEY-AND-KEYWAY COUPLING FOR TRANSMITTING TORQUE

BACKGROUND OF THE INVENTION

This invention was made in the course of, or under, a contract with the United States Atomic Energy Commission.

This invention relates generally to torque-transmitting couplings of the key-and-keyway type and more particularly to improvements in the same for reducing stress concentrations in a keyed shaft in torsion.

When a key in a keyway is used to transmit torque, as from a shaft to a hub, the distribution of stresses in the regions about the shaft keyway is three-dimensional and is complicated in nature. Various attempts have been made to correlate the location and magnitude of these stresses with the shape and size of the key and keyway, and it is well known that in general the shaft region in the vicinity of the inboard end of the keyway is the most critical from the standpoint of fatigue. This is true for various forms of keyways, including the two most commonly used designs —i.e., (1) the "profile" which is a flat-bottomed ⌑-shaped groove having dished, or rounded, ends, and (2) the "sledrunner," which comprises a flat-bottomed ⌑-shaped groove merged, at its inboard end, with a longitudinally arcuate ramp. In side view the sledrunner ramp defines an arc, whereas in transverse section it defines a straight line.

Various design features have been used to reduce the stress concentrations produced in cylindrical shafts when loaded in torsion by forces applied by a key to the wall of a keyway. For example, fillets at the junctions of the bottom and sides of the keyway have been found advantageous. Again, in some applications a reduction in stress concentrations has been effected by rounding the end of the key, as in keys of the Pratt and Whitney type. The following are two publications which summarize current industrial practice relating to the design of keys and keyways for transmitting torque: (1) USA Standard B17.1 and B17.2 "Keys and Keyseats," published by the American Society of Mechanical Engineers, and (2) Stress Concentration Factors, R. E. Peterson, John Wiley & Sons, New York, 1953.

Despite the appreciable advances which have been made in the design of key-type couplings, still further improvement is desired so that larger torsional loads can be transmitted safely and efficiently. As applied to drive shafts, such improvements would permit not only the manufacture of higher-capability shafts but also the upgrading of shafts now in service.

SUMMARY OF THE INVENTION

It is, therefore, an object of this invention to provide a key-and-keyway coupling of improved design.

It is another object to provide an improved key-and-keyway coupling for transmitting torque between a shaft and a hub, said coupling effecting a reduction in torsion-induced stresses in the shaft or hub.

It is another object to provide a keyway of improved design for transmitting torque from a first member to a second member, said keyway effecting a reduction in torsion-induced stress concentrations in said first member in the vicinity of the key and keyway.

It is another object to provide an improved key for reducing torsion-induced stress concentrations.

Other objects will be made evident hereinafter.

The invention can be characterized broadly as follows. In an assembly including first and second members coupled by a torque-transmitting key seated in at least one longitudinally extending keyway formed in one of said members, the bottom surface of said keyway including a substantially straight portion merged with a terminal ramp portion, the improvement comprising the surface of said ramp portion as viewed in transverse section defining an outwardly concave arc.

BRIEF DESCRIPTION OF THE PREFERRED EMBODIMENT

This invention is broadly applicable to couplings of the key-and-axial-keyway type for the transmission of torque between a shaft and a hub. The term key is used herein to include not only demountable keys and pins, but also integral keys such as splines. For brevity, the invention will be illustrated in terms of a coupling comprising a specially designed key, a specially designed keyway therefor formed in a drive shaft, and a conventional keyway therefor formed in a hub.

Figure 1:
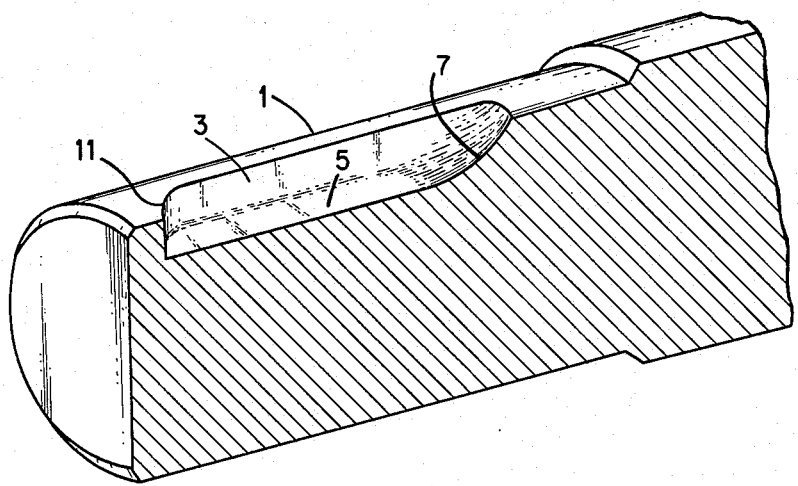
FIG. 1 is a perspective view of an end portion of a drive shaft having a keyway designed in accordance with this invention. The shaft is shown in longitudinal section.

FIG. 1 shows a stepped end portion of a conventional rotary drive shaft 1 provided with a longitudinally extending keyway 3 designed in accordance with this invention. As shown, the keyway consists of two portions, 5 and 7. The outboard portion 5 (the portion nearer the end of the shaft) is substantially straight, is ⌑-shaped in cross section, and has a radiused end wall. That is, this portion can be similar to an end portion of a conventional keyway of the profile type. Extending from the portion 5 is an inboard ramp portion 7 which in profile defines an outwardly concave arc and in transverse section also defines an outwardly concave arc. That is, in the embodiment shown the inboard end portion of the keyway terminates in a ramp which in profile is similar to the ramp of the conventional sledrunner keyway. In distinct contrast to the sledrunner and other previous keyways, however, the ramp 7 is dished transversely so that the surface of the ramp as viewed in cross section defines an outwardly concave arc. Dishing the ramp transversely provides significant advantages. For example, it helps to smooth the transition from a keyed shaft end of reduced diameter to a full diameter portion of the shaft. Again, it presents to the stress field a gradual change in shaft cross section and a continuously arcuate transition at the keyway end, thus eliminating the problem of sudden diameter changes (as found in the profile keyway) and of small-end radius (as found in the sledrunner keyway).

Figure 2:
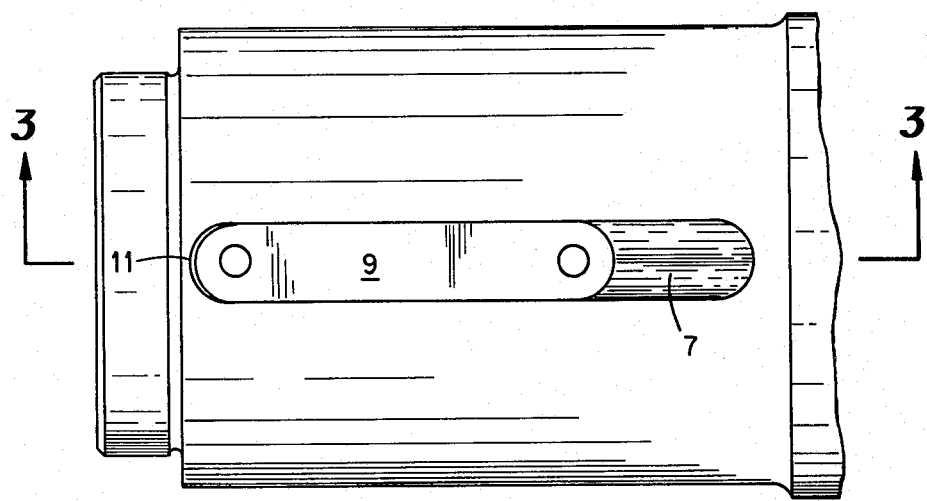
FIG. 2 is a plan view of the same, showing a specially designed key seated in the keyway.

In the embodiment shown in FIG. 1, the ramp 7 is dished transversely for a major portion of its length. That is, the ramp surface is designed as a smooth and shallowly concave transition extending from the region of the flat-bottomed portion 5 to the periphery of the shaft. As formed by conventional machining techniques, the ramp includes a relatively short flat section adjoining the portion 5 and a relatively long, progressively more concave portion extending from the flat land to the inboard end of the ramp. In the particular form shown, the ramp is machined so that the surface of its concave portion defines a circle-arc as viewed in cross section, the intersection of the ramp and the periphery of the shaft defining a circle-arc, as shown in FIG. 2. A circle-arc contour reduces stress concentrations significantly, but other arcuate contours also provide reductions in such concentrations. For example, the ramp surface may be dished so as to define elliptical, parabolic, or hyperbolic arcs. For many applications the ramp surface is dished so that the transversely extending arc is disposed symmetrically about the major axis of the ramp. In some applications, however, an asymmetrically disposed arc may be preferred. For example, where the keyway is formed in a shaft which is loaded in one direction, it may be preferable to form the ramp with a uniformly concave surface — i.e., a surface which viewed in cross section defines an arc symmetrically disposed about the major axis of the ramp —and then, in a second operation to increase the radius of the lateral portion of the ramp adjoining the region subject to tensile stresses, as by feathering or smoothing.

As indicated in FIG. 1, the ramp 7 is designed with a length greater than the maximum depth of the keyway. The stress concentrations in the vicinity of the keyway decrease with increases in the length of the ramp. In many applications, good results are obtained if the length of the ramp is in the range of from about one to four times the depth of the keyway. In the embodiment shown in the figures, the ramp 7 in side view defines an arc, but this is not essential. Beneficial reductions in stress concentrations are obtained if the transversely dished ramp is designed with a straightline profile.

The depth of the keyway, and other of its dimensions not discussed above, can be in accordance with current industrial practice. If desired, the keyway can be provided with stress-relieving fillets at the junctions of the side walls and the flat-bottomed portion 5. Best results are obtained if the ratio of the fillet radius to the shaft diameter exceeds about 0.012. The hub 13 (FIGS. 3 and 4) is provided with any suitable standard keyway 15 for reception of the key 9.

Figure 3:
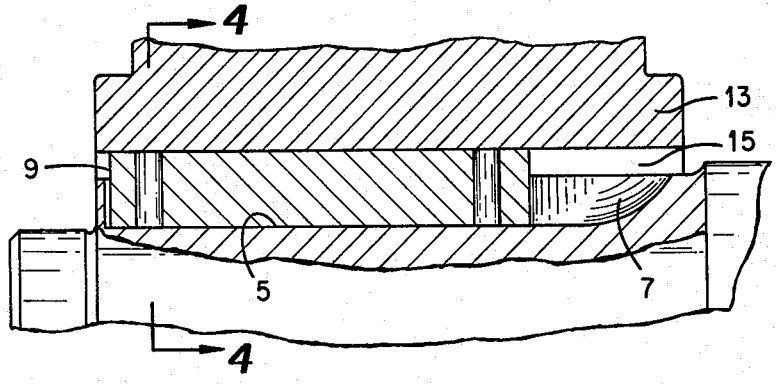
FIG. 3 is a fragmentary sectional view taken along lines 3—3 of FIG. 2 and also showing a portion of a hub keyed to the shaft.
Figure 4:
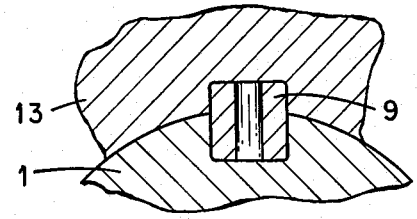
FIG. 4 is a fragmentary sectional view taken along line 4—4 of FIG. 3.

The improved keyway 3 can be used to advantage with keys of conventional design but larger reductions in stress concentrations can be achieved if the keyway is used in combination with a specially designed key 9 illustrated in FIGS. 2–4. In general, this key can be designed in accordance with current industrial practice, but in addition it is designed with end portions having lower stiffness than the central portion of the key. This distributes the load more uniformly at the ends of the key, reducing stress concentrations in nearby regions of the shaft. The stiffness of the end portions of the key can be reduced in any suitable manner, as by forming these portions of a softer material than is used for the remainder of the key, tapering, or perforating at an angle to the axis. Good results are obtained if each end portion is centrally bored from top to bottom as shown, the diameter of the bore preferably being about one-half of the width of the key. Transversely, extending bores reduce the end stiffness to a lesser extent. As shown, the improved key 9 preferably is formed with transversely arcuate ends. Preferably, the ends define a circle-arc, i.e., are of constant radius. Such rounding is standard and, together with the reduced end-stiffness referred to above, aids in a gradual ending of keyside-to-keyway wall contact stresses. Even if used in a conventional keyway, a key designed in accordance with this invention, i.e., a key designed with reduced end stiffness, will provide a reduction in stress concentrations as compared with conventional keys.

In the embodiment shown in FIGS. 2 and 3, the key 9 is substantially coextensive with the flat-bottomed portion 5 of the keyway. For applications where the keyway is near a free end of the shaft, the outboard end (11, FIG. 2) can be of standard profile design, with the key fitted snugly against this end (since no stress buildup is caused at the free end of the shaft). The opposite end of the keyway and key would be designed as shown in the figures, with spacing provided between the key and the inboard end of the keyway. In applications where the keyway is between two driving or opposing torques, both ends of the keyway would be designed with transversely dished ramps, and preferably both ends of the key would be designed to have reduced stiffness, as described. For heavy-duty applications, the shaft 1 can be provided with a plurality of the improved couplings.

Thus, as described above, the improved coupling preferably includes the combination of (1) a keyway at least one end of which terminates in an outwardly concave ramp portion and (2) a key having end sections of lower stiffness than its central section, the key being seated in the keyway out of contact with the concave portion thereof.

Studies of models of keyed shafts have demonstrated that each of the features just recited effects some reduction in stress concentrations in the vicinity of the keyway and that in combination they can provide reductions up to about 50%. The shaft models used in these studies were circular cylinders composed of conventional photoelastic material. Two diametrically opposed keyways were machined in either end of each shaft, such that the plane of the keys at one end was perpendicular to the plane of the keys at the other end. Each of the shafts then was loaded in torsion by equal and opposite couples at each end. Tangential forces which comprised these couples were transmitted to the shaft through keys in each of the keyways. After stress-freezing, a series of slices was taken at a 45° angle to the longitudinal axis of each key near the inner end, in order to determine the separate contributions of the keyway geometry and the key-bearing pressure on the total elastic stress concentration.

This improved coupling is considered to be a significant advance in the art, as evidenced by the following.

EXAMPLE

At the three United States gaseous diffusion plants for the separation of uranium isotopes, thousands of motor-driven compressors are used to circulate a process gas through separative stages. The drive-motor power ratings range from hundreds to thousands of horsepower. The shaft of the typical compressor or motor is composed of a medium-carbon, medium-strength steel and is designed with a reduced-diameter end section which is keyed at one point or two oppositely disposed points to a coupling for transmitting torque. The motor and compressor shafts are keyed to the coupling by one or two standard keys fitted in keyways of the profile and sledrunner types.

A study was made of the feasibility of increasing the power input to certain of the larger compressor-drive motors by more than 90%. This study showed that the shafts of these motors had inadequate strength for use at the proposed higher power levels, since the shafts were found likely to fail from fatigue in the vicinity of the inboard ends of the keyways. Accordingly, consideration was given to procuring new shafts of the same design but composed of a higher-strength alloy providing adequate strength for the proposed service conditions.

As a consequence of this invention, it has been found that the abovementioned diffusion plant shafts can be upgraded for use at the specified higher power input merely by re-machining the keyways to the design shown in FIGS. 2-4. The resulting cost reduction for the gaseous diffusion plants is estimated at over ten million dollars. The re-working of the shaft keyways can be accomplished with conventional machining tools and techniques. For instance, the longitudinally and transversely arcuate ramp 7 (FIGS. 1-3) can be formed with a conventional end mill which is withdrawn radially as it is advanced longitudinally toward the inboard end of the keyway. If desired, the improved keyway can be formed with a hydraulic profile-following mill, a numerically controlled mill, or a standard mill with a cherrying head attachment.

The following is a more specific illustration of the invention as applied to increasing the input power rating of a compressor shaft composed of AISI 1045 steel and designed initially for an input of 3800 horsepower. The shaft has a nominal diameter of 5.500 inches and a reduced-end diameter of 5.250 inches. Two couplings of the kind illustrated in FIGS. 1-4 are provided at diametrically opposed locations on the smaller end of the shaft, the outboard ends of the keyways being one inch from the end of the shaft. The keyways are formed with an end mill, using the technique referred to above. At its inboard end each keyway terminates in a ramp whose surface is dished transversely to define a circle-arc, this dished section extending from the inboard end of the ramp nearly to the other end of the ramp. The keyway dimensions are as follows: width 0.873 inch; depth 0.436 inch; length of flat portion 5 (FIGS. 1 and 3), 5.25 inches; ramp radius in the longitudinal direction, 1.5 inches; radius of the ramp circle-arc at the inboard end of the ramp, ~0.44 inch; radius of keyway fillets, 0.13 inch. The keys, composed of AISI 1040 steel, each have the following dimensions: length, 4.88 inches; width, 0.874 inch; thickness, 0.872 inch; bores, 0.375 inch diameter. It will be understood that these dimensions are presented only for the purpose of illustration and they are not necessarily the optimum for upgrading the particular shaft described. The selection of the various key and keyway dimensions for upgrading an existing shaft or for designing a shaft in accordance with this invention is well within the skill of those versed in the art. As mentioned, known apparatus and techniques may be employed in the fabrication of the improved key and keyway.

Numerous drive shaft studies of the kind described above have demonstrated that key-and-keyway couplings of this improved design can reduce stress concentrations in the vicinity of the key and keyway by as much as 50%.

What is claimed is:

1. An assembly including first and second members coupled by a torque-transmitting key of generally rectangular cross section, at least one of said members having a longitudinally extending keyway including a substantially straight ⌒-shaped key-seat, the bottom of said key-seat being merged with a longitudinally arcuate ramp which as viewed in transverse section defines an outwardly concave arc.

2. The assembly of claim 1 wherein said keyway is formed in said shaft relatively near an end thereof and wherein said ramp portion is disposed at the more remote end of said keyway relative to said end of said shaft.

3. The assembly of claim 1 wherein the length of said substantially straignt portion exceeds the length of said key.

4. The assembly of claim 1 wherein said key is disposed substantially co-extensive with said straight portion and out of contact with said ramp.

5. The assembly of claim 1 wherein said arc is disposed symmetrically about the major axis of said ramp portion.

6. The assembly of claim 1 wherein said arc is substantially a circle-arc.

7. The assembly of claim 6 wherein the radius of said arc at the inboard end of said ramp portion is substantially one-half the width of said keyway.

8. The assembly of claim 1 wherein said key includes a central portion having a selected stiffness and end portions each having a lower stiffness than said central portion.

9. An assembly including
 a first rotatable member;
 a second rotatable member coaxial with said first member;
 a key for transmitting torque from one of said first member and second member to the other of said first and second member, said key defining a rectangle in transverse section and longitudinal section and having a central section whose stiffness exceeds that of its end sections; and
 a longitudinally extending keyway in the periphery of one of said first and second member for receiving said key, said keyway having a substantially straight key-seat portion of generally ⌒-shape in cross section merged with a longitudinally extending ramp whose surface in transverse section defines an outwardly concave arc.

10. An assembly including first and second members coupled by a key for transmitting torque, at least one of said members having a longitudinally extending keyway including a ⌒-shaped key-seat for reception of said key, the bottom of said key-seat being merged with a longitudinally extending and transversely arcuate ramp, said ramp having a substantially straight-line profile.

* * * * *